US012292060B2

(12) United States Patent
Shimada et al.

(10) Patent No.: US 12,292,060 B2
(45) Date of Patent: May 6, 2025

(54) FLUID CIRCUIT

(71) Applicant: EAGLE INDUSTRY CO., LTD., Tokyo (JP)

(72) Inventors: Yoshiyuki Shimada, Tokyo (JP); Koji Sato, Tokyo (JP); Yuta Okamoto, Tokyo (JP); Tomoki Seki, Tokyo (JP); Tatsuhiro Arikawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/284,249

(22) PCT Filed: Mar. 17, 2022

(86) PCT No.: PCT/JP2022/012345
§ 371 (c)(1),
(2) Date: Sep. 26, 2023

(87) PCT Pub. No.: WO2022/209968
PCT Pub. Date: Oct. 6, 2022

(65) Prior Publication Data

US 2024/0159252 A1 May 16, 2024

(30) Foreign Application Priority Data

Mar. 31, 2021 (JP) ................................ 2021-059973

(51) Int. Cl.
*F15B 1/04* (2006.01)
*F15B 1/26* (2006.01)

(52) U.S. Cl.
CPC . *F15B 1/04* (2013.01); *F15B 1/26* (2013.01)

(58) Field of Classification Search
CPC ...... F14B 1/04; F14B 1/26; F14B 3/00; F15B 1/04; F15B 1/26; F15B 3/00
See application file for complete search history.

(56) References Cited

U.S. PATENT DOCUMENTS 3,811,795 A 5/1974 Olsen ........................ F03C 1/10
5,007,544 A 4/1991 Saotome ................ B66C 13/18
(Continued)

FOREIGN PATENT DOCUMENTS

EP 0439621 8/1990 .............. F15B 11/01
GB 2275969 9/1994 ................ F15B 3/00
(Continued)

OTHER PUBLICATIONS

International Search Report and Written Opinion, and International Preliminary Report on Patentability issued in PCT/JP2022/034388, dated Nov. 22, 2022, 24 pages.
(Continued)

*Primary Examiner* — Kenneth Bomberg
*Assistant Examiner* — Daniel S Collins
(74) *Attorney, Agent, or Firm* — HAYES SOLOWAY P.C.

(57) ABSTRACT

A fluid circuit includes first switching valve that switches between flow passages and first flow passages according to a change in a fluid pressure to be applied, a second switching valve that is switched to a flow passage which applies the fluid pressure to the first switching valve, when a piston has reached an initial position or an end position, and second flow passages. A biasing force of a biasing member when the piston reaches the end position is smaller than a pressing force acting on the piston due to the fluid pressure caused by a fluid supply device, and a biasing force of the biasing member when the piston reaches the initial position is larger than a sum of a flow passage resistance force acting on the first flow passages and a flow passage resistance force acting on the second flow passages.

5 Claims, 5 Drawing Sheets

(56) References Cited

U.S. PATENT DOCUMENTS

| | | | | |
|---|---|---|---|---|
| 5,706,657 | A | 1/1998 | Ambroski | E02F 9/2207 |
| 6,526,747 | B2 | 3/2003 | Nakatani | F15B 11/165 |
| 9,051,944 | B2 | 6/2015 | Wen | F15B 21/14 |
| 9,279,236 | B2 | 3/2016 | Zhang | E02F 9/2217 |
| 10,288,094 | B2 | 5/2019 | Spielvogel | E02F 9/2232 |
| 2009/0317267 | A1 | 12/2009 | Gill et al. | F04B 49/06 |
| 2020/0032485 | A1 | 1/2020 | Hijikata et al. | E02F 9/22 |
| 2024/0159252 | A1 | 5/2024 | Shimada | F15B 1/04 |

FOREIGN PATENT DOCUMENTS

| | | | |
|---|---|---|---|
| JP | 58102804 | 6/1983 | F15B 11/02 |
| JP | 58191388 | 12/1983 | F04B 31/00 |
| JP | 374605 | 3/1991 | F15B 11/00 |
| JP | H04120324 | 4/1992 | E02F 9/22 |
| JP | H04366001 | 12/1992 | F15B 3/00 |
| JP | H0777205 | 3/1995 | E02F 3/36 |
| JP | 10175459 | 6/1998 | B60K 25/00 |
| JP | 2000329103 | 11/2000 | F15B 7/02 |
| JP | 2003013904 | 1/2003 | F04B 9/105 |
| JP | 2008185182 | 8/2008 | F15B 21/14 |
| JP | 2008190694 | 8/2008 | F15B 11/00 |
| JP | 2011185417 | 9/2011 | F16H 61/00 |
| JP | 2014013062 | 1/2014 | F15B 11/028 |
| JP | 20168695 | 1/2016 | F15B 11/02 |
| JP | 2018204772 | 12/2018 | F15B 11/02 |
| JP | 2019049321 | 3/2019 | F15B 21/14 |
| WO | WO2016169943 | 10/2016 | E02F 9/2217 |

OTHER PUBLICATIONS

International Search Report and Written Opinion, and International Preliminary Report on Patentability issued in PCT/JP2022/012344, dated May 31, 2022, 20 pages.

International Search Report and Written Opinion, and International Preliminary Report on Patentability issued in PCT/JP2022/012345, dated May 17, 2022, 24 pages.

International Search Report and Written Opinion, and International Preliminary Report on Patentability issued in PCT/JP2022/012346, dated May 31, 2022, 24 pages.

U.S. Appl. No. 18/284,248, filed Sep. 26, 2023, Arikawa et al.

U.S. Appl. No. 18/284,520, filed Sep. 27, 2023, Shimada et al.

U.S. Appl. No. 18/284,249, filed Sep. 26, 2023, Shimada et al.

U.S. Appl. No. 18/691,421, filed Mar. 12, 2024, Shimada et al.

Official Action issued in related U.S. Appl. No. 18/284,248, dated Jul. 3, 2024, 13 pages.

Official Action issued in related U.S. Appl. No. 18/284,520, dated Jul. 18, 2024, 10 pages.

Official Action issued in related U.S. Appl. No. 18/284,248, dated Sep. 28, 2024, 9 pages.

Parker Hannifin catalog “Hydraulic Cartridge Systems”, HY15-3502/US, excerpt of pages CV1-CV2 (Year 2010).

FLUID CIRCUIT

TECHNICAL FIELD

The present invention relates to a fluid circuit including a pressure-increasing device that increases a pressure of a working fluid.

BACKGROUND ART

In various fields, there is known a fluid circuit that drives an actuator using a working fluid such as working oil delivered from a fluid supply device such as a pump. Such a fluid circuit includes a pressure-increasing device capable of delivering the working fluid that is increased in pressure, and the actuator is actuated by the working fluid of the pressure-increasing device, or the working fluid is accumulated in an accumulator.

For example, a fluid circuit disclosed in Patent Citation 1 mainly includes a pump, a tank, a pressure-increasing device, and an accumulator. The pressure-increasing device includes a cylinder, a piston, and biasing means. The cylinder has a T-shaped hollow structure when viewed from the front. The piston has a T shape when viewed from the front, and is provided inside the cylinder so as to be reciprocatable in an axial direction. The biasing means biases the piston toward one axial side.

A space inside the cylinder is partitioned into a back pressure chamber and a pressure-increasing chamber by the piston. A pressure-receiving area of an end surface of the piston facing the back pressure chamber is larger than a pressure-receiving area of an end surface of the piston facing the pressure-increasing chamber. A flow passage communicating with the pump and a flow passage communicating with the tank are connected to the back pressure chamber. Switching between the flow passages communicating with the back pressure chamber is performed by switching the switching valve. A flow passage communicating with a tank side and a flow passage communicating with an accumulator side are connected to the pressure-increasing chamber.

Accordingly, in a state where the working fluid is stored in the pressure-increasing chamber, when the working fluid is delivered from the pump to the back pressure chamber, the piston moves to the other axial side. Then, the pressure-increasing device delivers the working fluid, which is compressed in the pressure-increasing chamber to be increased in pressure, to the accumulator side. In addition, a valve position of the switching valve is switched to allow communication between the back pressure chamber and the tank, and to start to discharge the hydraulic oil in the back pressure chamber to the tank, so that the pressure in the back pressure chamber gradually decreases. Then, when a biasing force of the biasing means is larger than a force to move the piston to the other axial side, the piston is moved to the one axial side, and the working fluid is suctioned to the pressure-increasing chamber from the tank.

CITATION LIST

Patent Literature

Patent Citation 1: JP 2011-185417 A (PAGE 7 and FIG. 1)

SUMMARY OF INVENTION

Technical Problem

In the pressure-increasing device as disclosed in Patent Citation 1, the valve position of the switching valve is switched according to the reciprocation of the piston, so that the working fluid which is increased in pressure can be continuously delivered to the accumulator. However, an electromagnetic switching valve that can be switched by an electric signal is generally used as such a switching valve. Therefore, the pressure-increasing device as disclosed in Patent Citation 1 requires a device that outputs an electric signal, a device that detects a valve position, and the like. Accordingly, the entirety of such a pressure-increasing device is increased in size, which is a problem. In addition, a control program for such a pressure-increasing device also becomes complicated, and there is also a cost issue.

The present invention is conceived in view of such problems, and an object of the present invention is to provide a fluid circuit capable of continuously driving a pressure-increasing device with a simple configuration.

Solution to Problem

In order to solve the foregoing problems, according to the present invention, there is provided a fluid circuit including: a fluid supply device that delivers a working fluid; a tank that stores the working fluid; a pressure-increasing device that increases a pressure of the working fluid; and an accumulator that accumulates the working fluid which is increased in pressure by the pressure-increasing device, wherein the pressure-increasing device includes a cylinder, a piston provided inside the cylinder so as to be reciprocatable in an axial direction, and a biasing member for biasing the piston toward a first axial side, a space inside the cylinder is partitioned into a back pressure chamber that is communicatable with a fluid supply device side and with a tank side and a pressure-increasing chamber that is communicatable with an accumulator side, by the piston, when the working fluid flows into the back pressure chamber from the fluid supply device, the piston is pressed to a second axial side opposed to the first axial side, and the working fluid that is increased in pressure in the pressure-increasing chamber is delivered to the accumulator side, a first switching valve that switches between a flow passage which allows communication between the back pressure chamber and the fluid supply device side and a first flow passage which allows communication between the back pressure chamber and the tank side, according to a change in a fluid pressure to be applied, a second switching valve that is switched to a flow passage which applies the fluid pressure to the first switching valve, when the piston has reached an initial position on the first axial side or when the piston has reached an end position on the second axial side, and a second flow passage that allows communication between the back pressure chamber and the pressure-increasing chamber, are provided, and a biasing force of the biasing member when the piston reaches the end position is smaller than a pressing force acting on the piston due to the fluid pressure caused by the fluid supply device, and a biasing force of the biasing member when the piston reaches the initial position is larger than a sum of a flow passage resistance force acting on the first flow passage and a flow passage resistance force acting on the second flow passage. According to the aforesaid feature of the present invention, the first switching valve and the second switching valve can switch between delivering the working fluid into the back pressure chamber from the fluid supply device and discharging the working fluid from the back pressure chamber to the tank by means of the fluid pressure. Namely, the fluid circuit can continuously drive the pressure-increasing device using the fluid pressure. Further, the biasing member has an adequate biasing force to move the piston to the initial position and to the end position. For this reason, the biasing member can reliably cause the piston to reciprocate between the initial position and the end position, and can reliably switch the first switching valve and the second switching valve.

It may be preferable that the piston includes the second flow passage. According to this preferable configuration, the extension of the second flow passage can be shortened. Accordingly, the biasing force required for the biasing member can be reduced by reducing the flow passage resistance force acting on the second flow passage.

It may be preferable that a check valve including a biasing portion for biasing in a closing direction is disposed in the second flow passage. According to this preferable configuration, when the piston is moved from the initial position to the end position, a problem that the working fluid in the pressure-increasing chamber flows back to the back pressure chamber does not occur. For this reason, a pressure-increasing efficiency of the pressure-increasing device is good.

It may be preferable that an area ratio between an effective cross-sectional area of the first flow passage and an effective cross-sectional area of the second flow passage is larger than an area ratio between an effective pressure-receiving area of the back pressure chamber and an effective pressure-receiving area of the pressure-increasing chamber. According to this preferable configuration, it is possible to reduce a resistance when the working fluid passes through the second flow passage, while being able to stably delivering the working fluid to the back pressure chamber and to the pressure-increasing chamber. Accordingly, a load acting on the biasing member can be reduced.

DESCRIPTION OF EMBODIMENTS

Modes for implementing a fluid circuit according to the present invention will be described below based on embodiments.

First Embodiment

A fluid circuit according to a first embodiment of the present invention will be described with reference to FIGS. 1 to 4.

Figure 1:
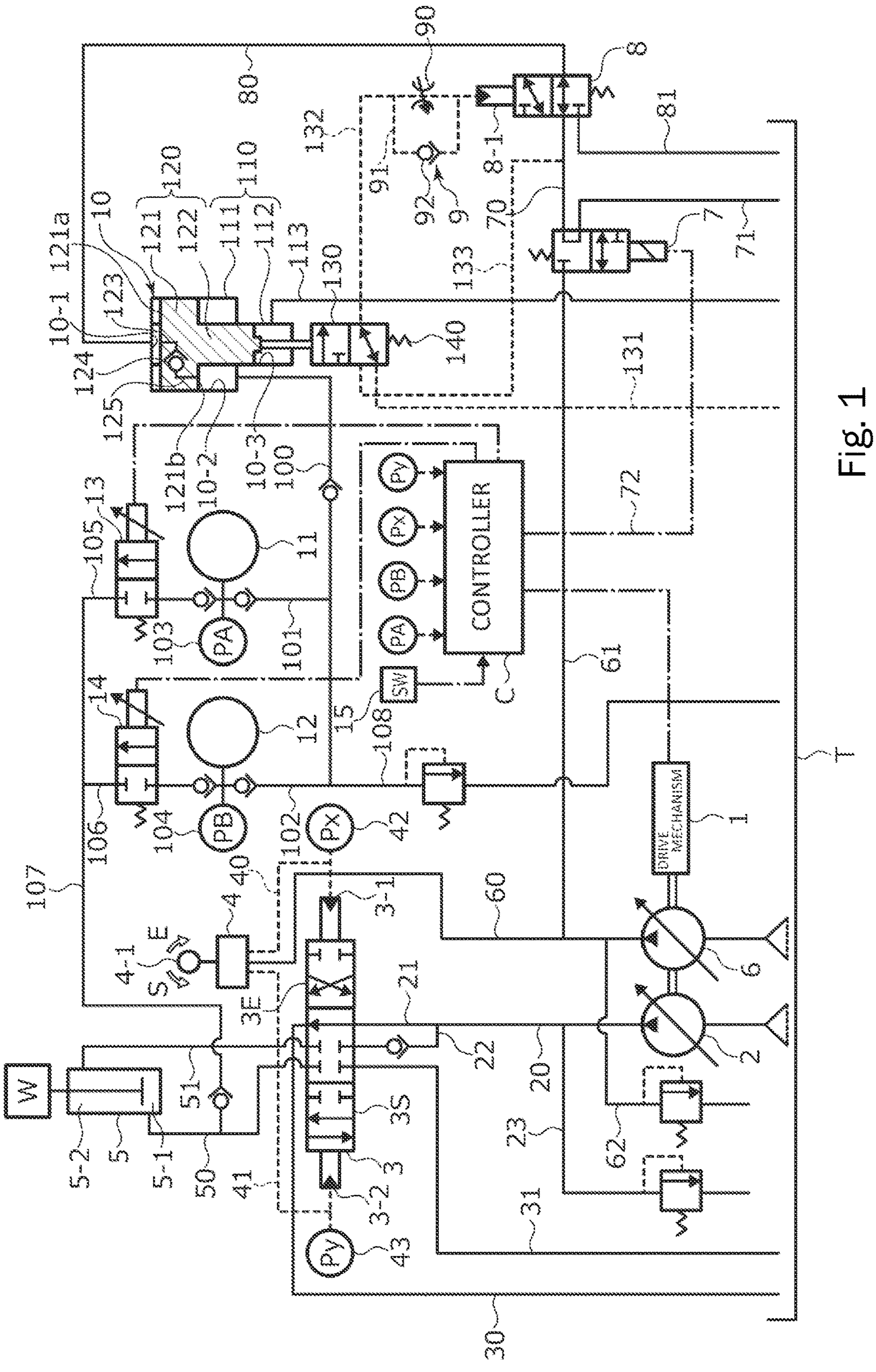
FIG. 1 is a schematic diagram illustrating a fluid circuit including a pressure-increasing device according to a first embodiment of the present invention.

As illustrated in FIG. 1, the fluid circuit can be applied to, for example, hydraulic devices such as an actuator, a brake, a steering wheel, and a transmission in normal passenger cars or work vehicles such as a truck, a hydraulic excavator, a forklift, a crane, and a garbage truck. Incidentally, the hydraulic circuit illustrated in FIG. 1 is one example of the fluid circuit of the present invention, and is not limited to a configuration of FIG. 1.

The fluid circuit of the present embodiment is generally configured to move a workpiece W by actuating a cylinder 5 as an actuator using hydraulic pressure.

The fluid circuit mainly includes a main circuit hydraulic pump 2, a switching valve 3, a hydraulic remote control valve 4, the cylinder 5, a pilot circuit hydraulic pump 6 as a fluid supply device, an electromagnetic switching valve 7, a first switching valve 8, an adjustable slow return valve 9, a pressure-increasing device 10, accumulators 11 and 12, electromagnetic proportional switching valves 13 and 14, a controller C, and each oil passage.

First, a configuration of a main circuit side on which the cylinder 5 is actuated by the main circuit hydraulic pump 2 (hereinafter, simply referred to as the hydraulic pump 2) will be described. The hydraulic pump 2 and the pilot circuit hydraulic pump 6 are connected to a drive mechanism 1 such as an engine of a vehicle. Accordingly, the hydraulic pump 2 and the pilot circuit hydraulic pump 6 driven by power from the drive mechanism 1 deliver hydraulic oil to oil passages 20 and 60.

The hydraulic oil delivered from the hydraulic pump 2 flows into the switching valve 3 through an oil passage 21 that is branched and connected to the oil passage 20.

The switching valve 3 is a six-port and three-position type open center switching valve. The switching valve 3 at a neutral position connects the oil passage 21 to a tank-side oil passage 30 and to a tank T. For this reason, the entire amount of the hydraulic oil delivered from the hydraulic pump 2 is discharged to the tank T.

In addition, the switching valve 3 at an extension position 3E connects an oil passage 22 to a head-side oil passage 50 of the cylinder 5 (hereinafter, simply referred to as the head-side oil passage 50). At the same time, the switching valve 3 connects a rod-side oil passage 51 of the cylinder 5 (hereinafter, simply referred to as the rod-side oil passage 51) to a tank-side oil passage 31 and to the tank T. The oil passage 22 includes a check valve that is branched and connected to the oil passage 20.

In addition, the switching valve 3 at a contraction position 3S connects the oil passage 22 to the rod-side oil passage 51. At the same time, the switching valve 3 connects the head-side oil passage 50 to the tank-side oil passage 31 and to the tank T.

On the other hand, the hydraulic oil delivered from the pilot circuit hydraulic pump 6 is supplied to the hydraulic remote control valve 4 through the oil passage 60.

Incidentally, the hydraulic oil supplied to the hydraulic remote control valve 4 is not limited to the hydraulic oil delivered from the pilot hydraulic pump, and may be a working fluid delivered from the hydraulic pump 2 and from the cylinder 5, or may be changed as appropriate.

The hydraulic remote control valve 4 is a variable pressure reduction valve. The hydraulic remote control valve 4 reduces the hydraulic oil of a pilot primary pressure to a pilot secondary pressure according to an operation amount of an operation lever 4-1. The hydraulic oil of the pilot primary pressure referred to here is the hydraulic oil delivered from the pilot circuit hydraulic pump 6. The hydraulic oil of the pilot secondary pressure acts on signal ports 3-1 and 3-2 of the switching valve 3 through pilot signal oil passages 40 and 41.

Incidentally, some of the hydraulic oil delivered from the pilot circuit hydraulic pump 6 may become extra oil that is not supplied from the hydraulic remote control valve 4 to the signal ports 3-1 and 3-2. Some of the extra oil flows into a pressure-increasing device 10 side to be described later through the oil passage 61, as working oil. On the other hand, all the extra oil other than the working oil is discharged to the tank T through a relief oil passage 62 including a relief valve.

Operation of the cylinder 5 according to operation of the hydraulic remote control valve 4 will be described. The switching valve 3 is switched to the extension position 3E by operating the operation lever 4-1 in an extension direction E. Then, the hydraulic oil delivered from the hydraulic pump 2 flows into a head chamber 5-1 of the cylinder 5 through the head-side oil passage 50 connected to the oil passages 20 and 22. At the same time, the hydraulic oil that has flowed out from a rod chamber 5-2 is discharged to the tank T through the tank-side oil passage 31 connected to the rod-side oil passage 51. At this time, an electric signal from a pressure sensor 42 installed on the pilot signal oil passage 40 is input to the controller C.

In addition, the switching valve 3 is switched to the contraction position 3S by operating the operation lever 4-1 in a contraction direction S. Then, the hydraulic oil delivered from the hydraulic pump 2 flows into the rod chamber 5-2 of the cylinder 5 through the rod-side oil passage 51 connected to the oil passages 20 and 22. At the same time, the hydraulic oil that has flowed out from the head chamber 5-1 is discharged to the tank T through the tank-side oil passage 31 connected to the head-side oil passage 50. At this time, an electric signal output from a pressure sensor 43 installed on the pilot signal oil passage 41 is input to the controller C.

In addition, a relief oil passage 23 including a relief valve is branched and connected to the oil passage 20. When the pressure in the oil passage 20 becomes abnormally high, the relief valve is released. Accordingly, the hydraulic oil is discharged from the relief oil passage 23 to the tank T.

Next, a configuration of a pilot circuit side that includes the pressure-increasing device 10 and that is connected to the pilot circuit hydraulic pump 6 will be described. Incidentally, the oil passage 60, the hydraulic remote control valve 4, the pilot signal oil passages 40 and 41, and the relief oil passage 62 described above are included in the configuration of the pilot circuit side.

The electromagnetic switching valve 7 is provided in the oil passage 61 that is branched and connected to the oil passage 60. When a switch 15 is in an OFF state, the electromagnetic switching valve 7 disconnects the oil passage 61 and an oil passage 70. At the same time, the electromagnetic switching valve 7 connects the oil passage 70 to an oil passage 71 connected to the tank T.

In addition, an electric signal input from the controller C when the switch 15 is set to an ON state is input to the electromagnetic switching valve 7 through an electric signal line 72. Accordingly, the electromagnetic switching valve 7 connects the oil passage 61 and the oil passage 70. At the same time, the electromagnetic switching valve 7 disconnects the oil passage 70 and the oil passage 71 (refer to FIG. 2).

The first switching valve 8 is provided in the oil passage 70. The first switching valve 8 is a switching valve that is switched to oil passages to be connected, according to pressure acting on a port 8-1. When the pressure acting on the port 8-1 is less than a predetermined value, the first switching valve 8 connects the oil passage 70 and an oil passage 80. At the same time, the first switching valve 8 disconnects the oil passage 80 and an oil passage 81. The oil passage 81 is connected to the tank T.

In addition, when the pressure acting on the port 8-1 is the predetermined value or more, the first switching valve 8 disconnects the oil passage 70 and the oil passage 80. At the same time, the first switching valve 8 connects the oil passage 80 and the oil passage 81 (refer to FIGS. 2C and 2D).

The pressure-increasing device 10 is connected to the oil passage 80. The pressure-increasing device 10 further increases a pressure of the hydraulic oil delivered from the pilot circuit hydraulic pump 6, and delivers the hydraulic oil to an oil passage 100 including a check valve. A configuration of the pressure-increasing device 10 will be described later.

Oil passages 101 and 102 are branched and connected to the oil passage 100. The oil passage 101 includes two check valves. The oil passage 102 includes two check valves separate from those of the oil passage 101.

The accumulator 11 and a pressure sensor 103 are connected to each other between the two check valves in the oil passage 101. The pressure sensor 103 detects a pressure of the accumulator 11. In addition, the electromagnetic proportional switching valve 13 is connected to a downstream side of the two check valves in the oil passage 101.

The accumulator 12 and a pressure sensor 104 are connected to each other between the two check valves in the oil passage 102. The pressure sensor 104 detects a pressure of the accumulator 12. In addition, the electromagnetic proportional switching valve 14 is connected to a downstream side of the two check valves in the oil passage 102.

The electromagnetic proportional switching valves 13 and 14 are a normally closed type, and are connected to the controller C through electric signal lines.

The controller C controls the electromagnetic proportional switching valves 13 and 14 to a closed state or an open state based on the electric signals input from the pressure sensors 42, 43, 103, and 104. Hereinafter, the electromagnetic proportional switching valve 13 will be described as an example.

When the pressure in the accumulator 11 decreases, an electric signal is input from the controller C, and the electromagnetic proportional switching valve 13 is set to a closed state. Accordingly, the accumulator 11 can accumulate the hydraulic oil in a pressure increased state delivered from the pressure-increasing device 10.

In addition, when the pressure in the accumulator 11 increases, an electric signal is input from the controller C to the electromagnetic proportional switching valve 13. Then, the electromagnetic proportional switching valve 13 connects the oil passages 101 and 105 at an opening degree according to the input signal. Accordingly, the accumulated hydraulic oil delivered from the accumulator 11 is recovered to the head chamber 5-1 of the cylinder 5 through an oil passage 107 including a check valve and through the head-side oil passage 50.

In addition, the switching of the electromagnetic proportional switching valves 13 and 14 is alternately performed by the controller C, so that the fluid circuit accumulates the hydraulic oil in one of the accumulators 11 and 12. At the same time, the fluid circuit can recover the hydraulic oil in a pressure increased state accumulated in the other accumulator, to a main circuit.

In addition, when the accumulated hydraulic oil in the accumulators 11 and 12 has reached an allowable amount, extra oil is generated in the oil passage 100. A relief oil passage 108 including a relief valve is branched and connected to the oil passage 100. The extra oil is discharged to the tank T through the relief oil passage 108.

Next, the pressure-increasing device 10 will be described. Incidentally, in this description, a spring 140 side and an opposite side of the pressure-increasing device 10 will be described as a second axial side (namely, a lower side in the drawings) and a first axial side (namely, an upper side in the drawings), respectively.

Figures 3A, 3B, 3C, 3D:
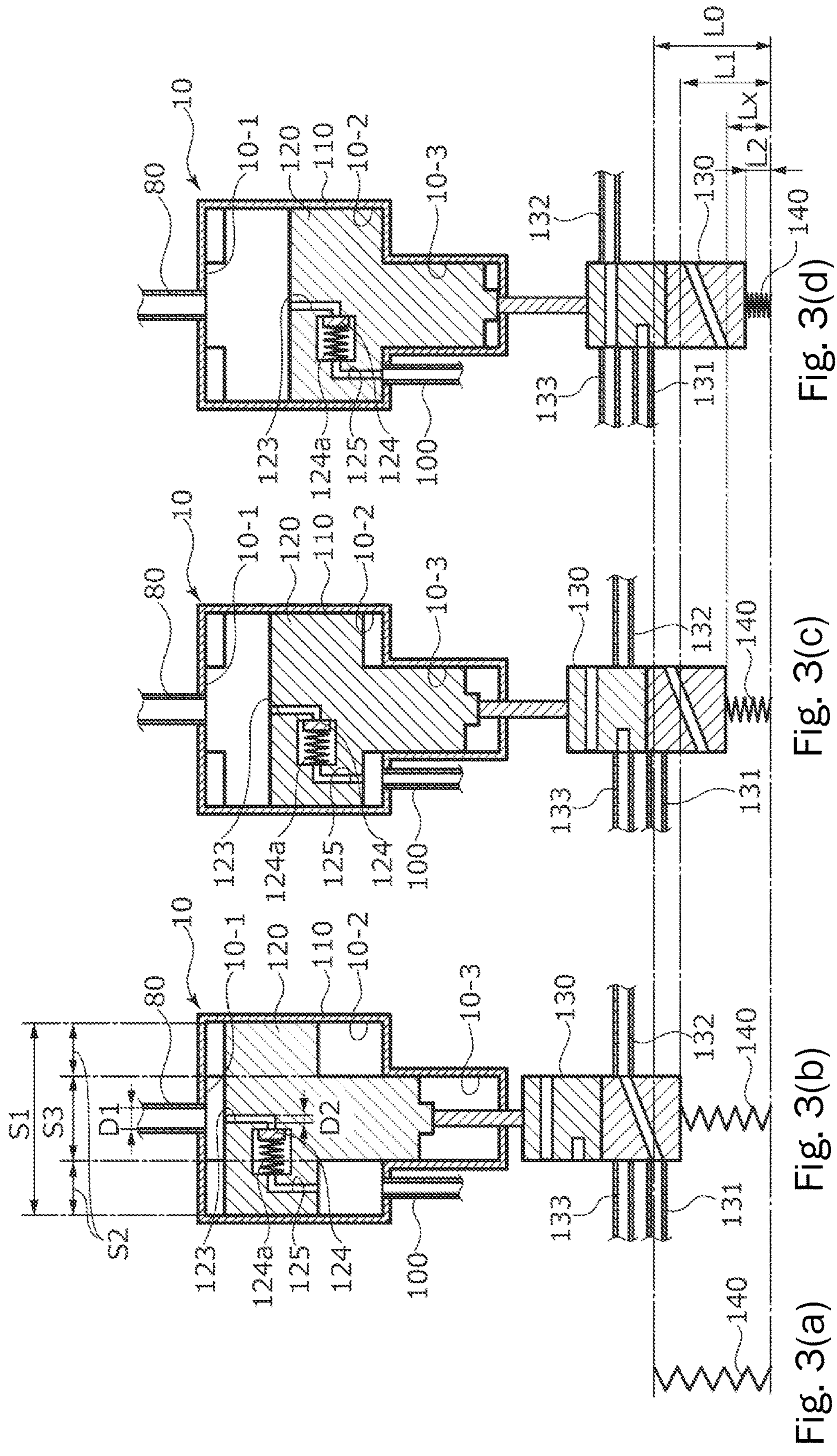
FIGS. 3(*a*)-3(*d*) are schematic diagrams for describing changes of a biasing member of the pressure-increasing device and of a second switching valve in the first embodiment of the present invention.
Figure 4:
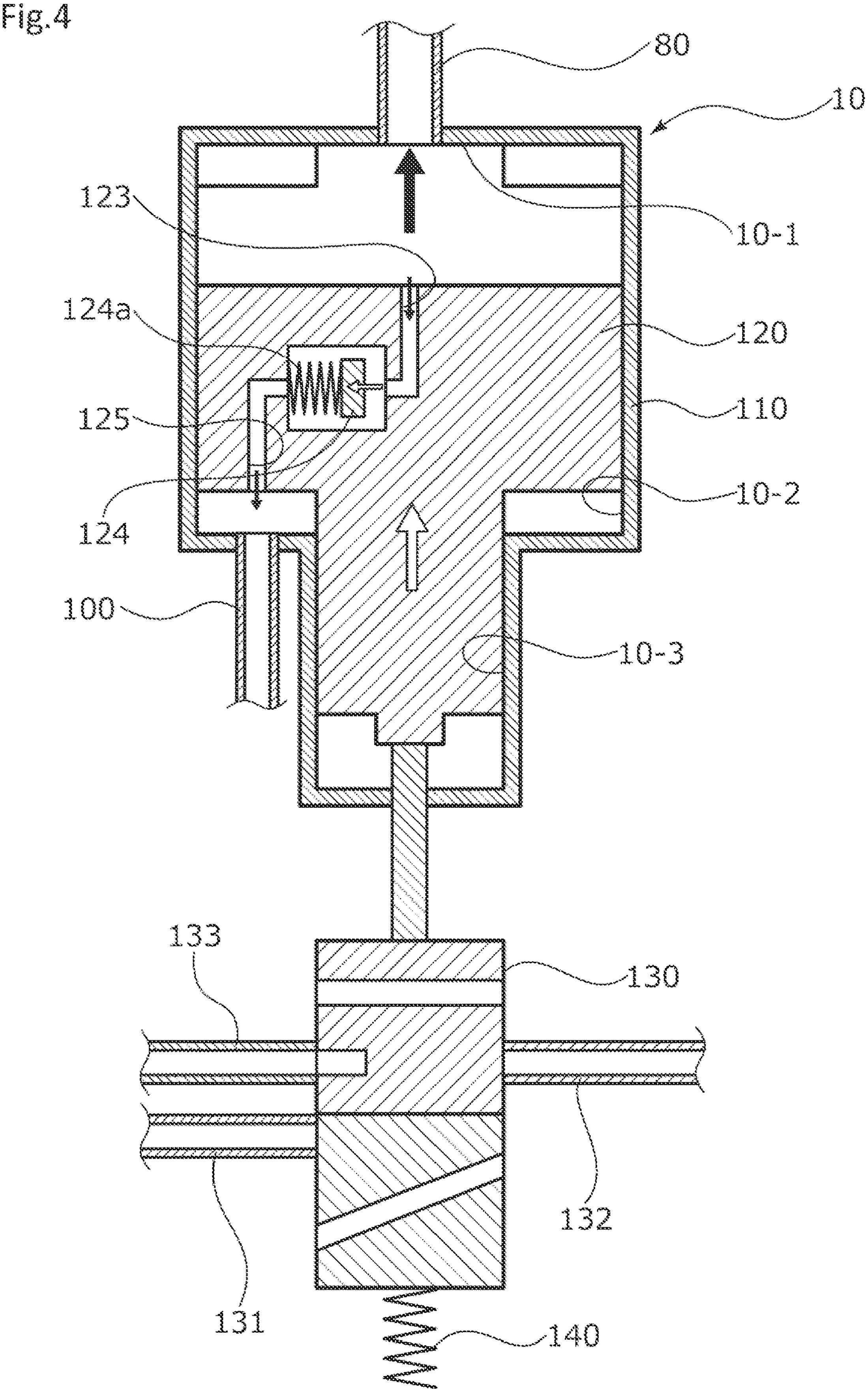
FIG. 4 is an enlarged schematic diagram illustrating main parts of the pressure-increasing device in the first embodiment of the present invention.

As illustrated in FIGS. 1 to 4, the pressure-increasing device 10 mainly includes a casing 110 as a cylinder, a piston 120, a second switching valve 130, and a spring 140 as a biasing member or biasing means. The piston 120 is provided to be movable inside the casing 110 in an axial direction. The spring 140 biases the piston 120 toward the first axial side. Incidentally, in FIGS. 1 to 4, the second switching valve 130 is illustrated in an enlarged manner to show switching of the oil passages. In addition, the pressure-increasing device 10 and each oil passage of FIGS. 3 and 4 are schematically illustrated based on graphic symbols used in FIGS. 1 and 2.

The casing 110 is formed in a substantially T-shaped stepped cylindrical shape when viewed from the front, and includes a large-diameter cylindrical portion 111 and a small-diameter cylindrical portion 112.

The oil passage 80 is connected to an upper portion of the large-diameter cylindrical portion 111. In addition, the oil passage 100 is connected to a lower end portion of the large-diameter cylindrical portion 111 on a radially outer side of the small-diameter cylindrical portion 112.

An oil passage 113 connected to the tank T is connected to a peripheral wall of the small-diameter cylindrical portion 112.

The piston 120 is formed in a T-shaped stepped columnar shape when viewed from the front, and includes a large-diameter portion 121 and a small-diameter portion 122.

The large-diameter portion 121 is formed such that an outer peripheral surface of the large-diameter portion 121 is slidable along an inner peripheral surface of the large-diameter cylindrical portion 111 of the casing 110. The small-diameter portion 122 is formed such that an outer peripheral surface of the small-diameter portion 122 is slidable along an inner peripheral surface of the small-diameter cylindrical portion 112 of the casing 110.

In addition, a back pressure chamber-side second oil passage 123, a check valve 124, and a pressure-increasing chamber-side second oil passage 125 are formed in the large-diameter portion 121. The back pressure chamber-side second oil passage 123 communicates with a back pressure chamber 10-1, extends downward in the axial direction, and extends substantially orthogonally in a radially outward direction. The check valve 124 is disposed between the back pressure chamber-side second oil passage 123 and the pressure-increasing chamber-side second oil passage 125. The pressure-increasing chamber-side second oil passage 125 extends from the check valve 124 to a radially outer side, extends substantially orthogonally downward in the axial direction, and communicates with a pressure-increasing chamber 10-2.

In a state where the piston 120 is stored, a space inside the large-diameter cylindrical portion 111 of the casing 110 is partitioned into the back pressure chamber 10-1 and the pressure-increasing chamber 10-2 by the large-diameter portion 121 of the piston 120. The oil passage 80 communicates with the back pressure chamber 10-1. The oil passage 100 communicates with the pressure-increasing chamber 10-2. In addition, a spacer that restricts movement of the piston 120 is fixedly disposed at an upper axial end in the back pressure chamber 10-1.

In addition, in a state where the piston 120 is stored, in the casing 110, a drain chamber 10-3 is partitioned off by the small-diameter cylindrical portion 112 of the casing 110 and the small-diameter portion 122 of the piston 120. The oil passage 113 communicates with the drain chamber 10-3.

The piston 120 is configured to be reciprocatable between an initial position and an end position. The initial position is a position where an upper end of the large-diameter portion 121 comes into contact with the spacer in the back pressure chamber 10-1 on an upper axial side and movement of the large-diameter portion 121 in the same direction is restricted. The end position is a position where a lower end of the large-diameter portion 121 comes into contact with a lower surface in the pressure-increasing chamber 10-2 on a lower axial side and movement of the large-diameter portion 121 in the same direction is restricted.

A rod of the second switching valve 130 penetrates through a bottom portion of the small-diameter cylindrical portion 112 of the casing 110. A force from pressure applied to an upper end surface 121*a* of the large-diameter portion 121 of the piston 120 acts on the second switching valve 130. Further, a biasing force of the spring 140 acts on the second switching valve 130. Accordingly, the rod of the second switching valve 130 holds a state where an upper end surface of the rod has come into contact with a lower end surface of the small-diameter portion 122 of the piston 120. In the present embodiment, the upper end surface 121*a* is a back surface of the large-diameter portion 121.

In addition, in a state where the piston 120 has reached the initial position, namely, in a state where movement of the piston 120 in the same direction on the upper axial side is restricted, the second switching valve 130 connects a drain oil passage 131 and a pilot oil passage 132. At the same time, the second switching valve 130 disconnects the pilot oil passage 132 and a pilot oil passage 133. The drain oil passage 131 is connected to the tank T. The pilot oil passage 132 is connected to the port 8-1 of the first switching valve 8. The pilot oil passage 133 is branched and connected to the oil passage 70.

In addition, in a state where the piston 120 has reached the end position, namely, in a state where movement of the piston 120 in the same direction on the lower axial side is restricted, the second switching valve 130 connects the pilot oil passages 132 and 133. At the same time, the second switching valve 130 disconnects the drain oil passage 131 and the pilot oil passage 132 (refer to FIGS. 2B and 2C).

The spring 140 is a spring member that is made of an elastic material having a constant spring constant k which is extendable and contractible in the axial direction, and that is formed with a natural length L0 (refer to FIG. 3A). The spring 140 is installed such that a base end portion (lower end portion in the drawing) of the spring 140 is fixed. In addition, a free end portion (upper end portion in the drawing) of the spring 140 is always in contact with a lower end surface of the second switching valve 130 in a compressed state. The spring 140 always biases the piston 120 to the upper axial side through the second switching valve 130 by means of a biasing force $F_{S1}$, $F_{SX}$, or $F_{S2}$ generated according to a compression position of the spring 140.

The adjustable slow return valve 9 formed of a variable throttle portion 90, a pilot oil passage 91, and a check valve 92 is provided in the pilot oil passage 132. The pilot oil passage 91 is connected to the pilot oil passage 132 across the variable throttle portion 90. The check valve 92 is provided in the middle of the pilot oil passage 91.

Next, a pressure-increasing cycle performed by the pressure-increasing device 10 will be described with reference to FIGS. 1 to 4.

First, a state before the increasing of pressure by the pressure-increasing device 10 is started will be described. As illustrated in FIG. 1, the switch 15 is in an OFF state, and the electromagnetic switching valve 7 disconnects the oil passages 61 and 70.

In the state before the increasing of pressure is started, the piston 120 is disposed at the initial position on the upper axial side inside the casing 110. In such a manner, a position which the piston 120 reaches before the increasing of pressure by the pressure-increasing device 10 is started, and at which upward axial movement of the piston 120 is restricted is the initial position of the piston 120. In the following description, the position is simply referred to as the initial position.

The spring 140 at the initial position has a length L1 (refer to FIG. 3B) that is slightly compressed from the natural length L0 (refer to FIG. 3A) (L0>L1).

In addition, as will be described later, a position where the increasing of pressure by the pressure-increasing device 10 is started, the piston 120 reaches a lower axial end, and downward axial movement of the piston 120 is restricted is the end position (refer to FIG. 3D) of the piston 120. In the following description, the position is simply referred to as the end position.

The spring 140 at the end position has a maximum compressed length L2 (refer to FIG. 3D) (L1>L2). In this state, needless to say, the spring 140 is within an elastic deformation range.

In the pressure-increasing device 10, oil is stored in the back pressure chamber 10-1, the pressure-increasing chamber 10-2, and the drain chamber 10-3. The pressure of the oil is substantially the same pressure $P_0$ (in the present embodiment, 0.1 MPa (=1.02 kg/cm$^2$)) as that of oil stored in the tank T that is open to the outside.

At this time, the biasing force $F_{S1}$ ($F_{S1}$=k×(L1−L0)) of the spring 140 when the piston 120 is at the initial position is larger than a pressing force $F_{H0}$ that presses the piston 120 downward in the axial direction due to the pressure $P_0$ in the back pressure chamber 10-1 ($F_{H0}$=$P_0$×S1). The biasing force $F_{S1}$ of the spring 140 maintains the piston 120 at the initial position.

In addition, in a state after the piston 120 has reached the initial position, the second switching valve 130 connects the oil passages 131 and 132. Accordingly, substantially the same pressure as that of the oil in the tank T acts on the port 8-1 of the first switching valve 8. Since the same pressure is less than a predetermined value, the first switching valve 8 connects the oil passages 70 and 80.

In the present embodiment, a fluid pressure $P_{H1}$ delivered from the pilot circuit hydraulic pump 6 is 1 MPa (=10.2 kg/cm$^2$). Incidentally, each numerical value described above may be changed as appropriate, and similarly, the following numerical values may also be changed.

Figure 2A:
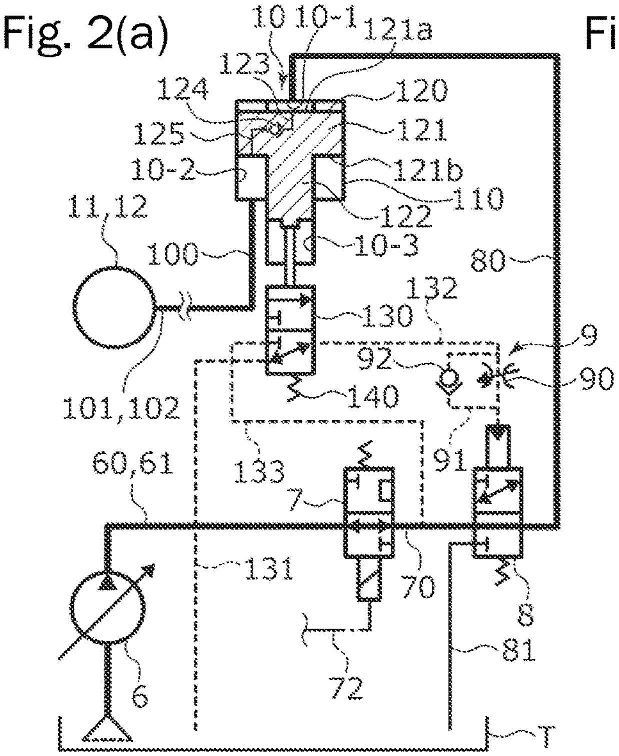
FIGS. 2(*a*)-2(*d*) are schematic diagrams for describing a pressure-increasing cycle of a working fluid performed by the pressure-increasing device in the first embodiment of the present invention.

When the increasing of pressure by the pressure-increasing device 10 is started, the switch 15 is set to an ON state. Accordingly, as illustrated in FIG. 2A, the electromagnetic switching valve 7 connects the oil passages 61 and 70. Then, some of the hydraulic oil delivered from the pilot circuit hydraulic pump 6 flows into the back pressure chamber 10-1 of the pressure-increasing device 10 through the oil passages 60 and 61, the electromagnetic switching valve 7, the oil passage 70, the first switching valve 8, and the oil passage 80.

Immediately after the hydraulic oil starts to be delivered from the pilot circuit hydraulic pump 6 to the back pressure chamber 10-1, as described above, the fluid pressure $P_{H1}$ of the hydraulic oil delivered from the pilot circuit hydraulic pump 6 is 1 MPa. On the other hand, the pressure of oil in the pressure-increasing chamber 10-2 is 0.1 MPa. For this reason, a pressure difference is generated between the pressure in the back pressure chamber-side second oil passage 123 communicating with the back pressure chamber 10-1 and the pressure in the pressure-increasing chamber-side second oil passage 125 communicating with the pressure-increasing chamber 10-2.

Due to the pressure difference, the check valve 124 is opened, and the hydraulic oil flows into the pressure-increasing chamber 10-2 from the back pressure chamber 10-1. The pressure in the pressure-increasing chamber 10-2 is increased higher than the pressure in the back pressure chamber 10-1 in a very short period of time by the inflow of the hydraulic oil and a movement of the piston 120. For this reason, the check valve 124 is closed.

Referring to FIGS. 1 and 3B, an area S1 as an effective pressure-receiving area of the back pressure chamber 10-1 is larger than an area S2 as an effective pressure-receiving area of the pressure-increasing chamber 10-2 by an area S3 (S1=S2+S3). The area S1 is an area of the upper end surface 121*a* of the large-diameter portion 121 of the piston 120. The area S2 is an area of an annular lower end surface 121*b* of the large-diameter portion 121 of the piston 120. The area S3 is a cross-sectional area of the small-diameter portion 122 of the piston 120.

A pressing force $F_{H1}$ obtained by multiplying the fluid pressure $P_{H1}$ of the hydraulic oil, which is delivered from the pilot circuit hydraulic pump 6 to flow into the back pressure chamber 10-1, by the area S1 of the upper end surface 121*a* ($F_{H1}$=$P_{H1}$×S1) acts on the large-diameter portion 121 of the piston 120. The pressing force $F_{H1}$ presses the piston 120 downward in the axial direction.

Needless to say, the pressing force $F_{H1}$ is larger than the biasing force $F_{S1}$ of the spring 140 at the initial position ($F_{H1}$>$F_{S1}$). Accordingly, the piston 120 smoothly moves toward the end position on the lower axial side.

Accordingly, the pressure of the hydraulic oil in the pressure-increasing chamber 10-2 is increased to a pressure $P_{H2}$ calculated by dividing the pressing force $F_{H1}$ by the area S2 of the lower end surface 121*b* of the piston 120 ($P_{H2}$=$F_{H1}$+S2). Then, the hydraulic oil of the pressure $P_{H2}$ that is increased in pressure as the piston 120 moves downward in the axial direction is sequentially delivered toward the oil passage 100.

Incidentally, in this description, the pressure of oil in the drain chamber 10-3 is substantially constant regardless of movement of the piston 120. In addition, the oil in the drain chamber 10-3 repeatedly flows in and out as the piston 120 moves. For this reason, a description of an influence of the oil in the drain chamber 10-3 will be omitted.

The spring 140 is compressed as the piston 120 moves downward in the axial direction, so that the biasing force $F_{SX}$ ($F_{SX}$=k×(Lx−L0)) of the spring 140 is increased. Then, when the piston 120 reaches the end position, the biasing force $F_{S2}$ ($F_{S2}$=k×(L2−L0)) of the spring 140 reaches its maximum value. Incidentally, as illustrated in FIG. 3C, Lx that is a length of the spring 140 while the piston 120 moves between the initial position and the end position is a variable between the lengths L1 and L2 (L1>Lx>L2).

Moreover, needless to say, the pressing force $F_{H1}$ caused by the fluid pressure of the hydraulic oil delivered from the pilot circuit hydraulic pump 6 is larger than the biasing force $F_{S2}$ ($F_{H1}$>>>$F_{S2}$). In other words, the spring 140 is configured to have a biasing force smaller than the pressing force $F_{H1}$ caused by the hydraulic oil delivered from the pilot circuit hydraulic pump 6, when the piston 120 reaches the end position.

Incidentally, an area ratio between the area S1 of the upper end surface 121*a* of the piston 120 and the area S2 of the lower end surface 121*b* thereof and the biasing force $F_{S2}$ of the spring 140 are adjusted such that the piston 120 reaches the end position even when the pressure in the pressure-increasing chamber 10-2 is increased.

In such a manner, when the piston 120 moves from the initial position to the end position, as illustrated in FIG. 3C, the second switching valve 130 disconnects both the oil passages 131 and 132 and the oil passages 132 and 133. Accordingly, the pressure acting on the port 8-1 (refer to FIG. 1) of the first switching valve 8 is kept constant. For this reason, the pressure acting on the port 8-1 is prevented from fluctuating and causing accidental switching of the oil passages.

Figure 2B:
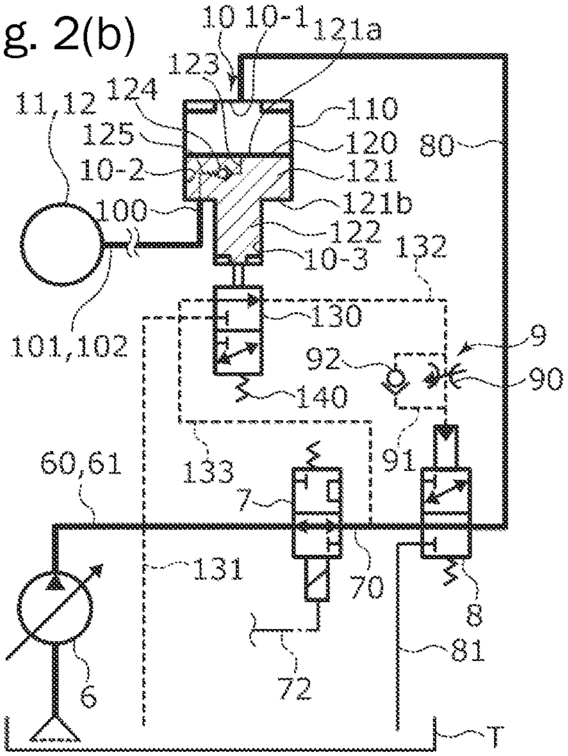

As illustrated in FIG. 2B, after the piston 120 has reached the end position, the second switching valve 130 connects the oil passages 132 and 133. Accordingly, the hydraulic oil flows into the pilot oil passage 132 from the pilot circuit hydraulic pump 6 through the pilot oil passage 133.

In addition, the adjustable slow return valve 9 is provided in the pilot oil passage 132. The hydraulic oil that has passed through the variable throttle portion 90 of the adjustable slow return valve 9 acts on the port 8-1. The variable throttle portion 90 that can be adjusted in opening degree can change the time it takes for pressure, which acts on the port 8-1 according to an opening degree of the variable throttle portion 90, to become a predetermined value or more. Namely, the variable throttle portion 90 can adjust the time it takes until the piston 120 starts to move from the end position toward the initial position.

Figure 2C:
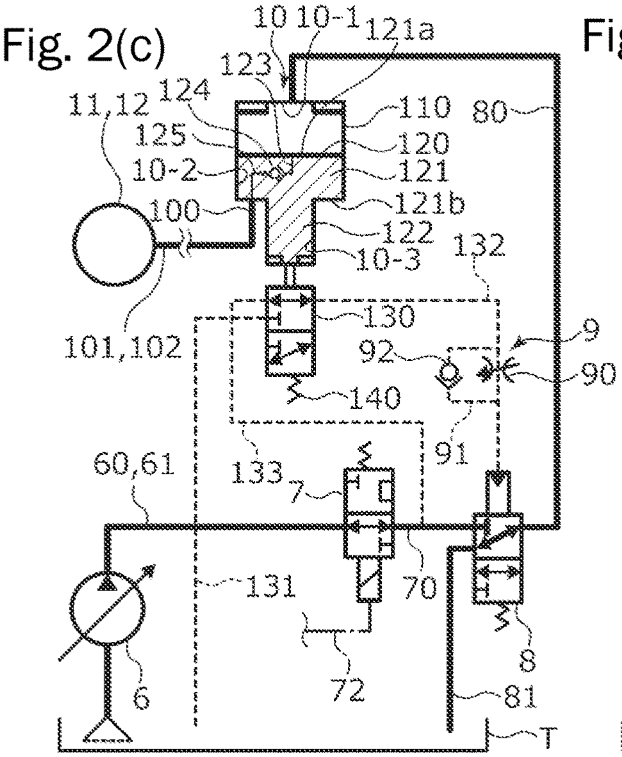

When the pressure acting on the port 8-1 is the predetermined value or more, as illustrated in FIG. 2C, the first switching valve 8 connects the oil passages 80 and 81. Accordingly, the hydraulic oil in the back pressure chamber 10-1 is discharged to the tank T through the oil passage 80, the first switching valve 8, and the oil passage 81. Namely, the oil passages 80 and 81 form a first flow passage of the present invention.

Then, a pressure $P_Y$ in the back pressure chamber 10-1 decreases and approaches the pressure $P_0$ of the oil stored in the tank T described above ($P_H1$>>$P_Y$>$P_0$). Thereafter, the biasing force $F_{S2}$ of the spring 140 when the piston 120 is at the end position is larger than a pressing force $F_{HY}$ ($F_{HY}$=$P_Y$× S1) that presses the piston 120 downward in the axial direction due to the pressure $P_Y$. Accordingly, as indicated using a thick white arrow in FIG. 4, the piston 120 starts to move upward in the axial direction ($F_{S2}$>$F_{HY}$). As the piston 120 moves, as indicated using a thick black arrow in FIG. 4, some of the oil in the back pressure chamber 10-1 flows out to the oil passage 80. Incidentally, the piston 120 may start to move upward in the axial direction when the pressure $P_Y$ becomes the same pressure as $P_0$.

In addition, as the piston 120 moves upward in the axial direction, the pressure-increasing chamber 10-2 is relatively reduced in pressure with respect to the back pressure chamber 10-1. Accordingly, as indicated using a thin white arrow in FIG. 4, the check valve 124 is opened. Then, as indicated using a thin black arrow in FIG. 4, some of the oil in the back pressure chamber 10-1 flows out toward the pressure-increasing chamber 10-2.

Namely, as the piston 120 moves upward in the axial direction, the oil in the back pressure chamber 10-1 branches and flows out to the oil passage 80 and to the pressure-increasing chamber 10-2. At this time, a flow passage resistance force R1 acts on the oil passing through the oil passage 80, and a flow passage resistance force R2 acts on the oil passing through the second oil passages 123 and 125 and through the check valve 124.

The flow passage resistance force R1 is derived from a viscosity of the oil and an in-pipe frictional coefficient, an inner diameter, a length, and the like of the oil passages 80 and 81. In addition, the flow passage resistance force R2 is derived from an elasticity of a coil spring 124*a* (refer to FIGS. 3 and 4) provided in the check valve 124 as a biasing portion, in addition to the viscosity of the oil and an in-pipe frictional coefficients, an inner diameter, a length, and the like of the second oil passages 123 and 125.

As the piston 120 moves upward in the axial direction, the spring 140 extends and the biasing force $F_{SX}$ is weakened. Then, when the piston 120 reaches the initial position, the biasing force $F_{S1}$ of the spring 140 reaches its minimum value. However, the biasing force $F_{S1}$ of the spring 140 is larger than the sum of the pressing force $F_{H0}$, the flow passage resistance force R1, and the flow passage resistance force R2 ($F_{S1}$>$F_{H0}$±R1+R2).

In other words, the spring 140 is configured to have a biasing force larger than the sum of the pressing force $F_{H0}$, the flow passage resistance force R1, and the flow passage resistance force R2 caused by the oil of which the flow passages are opened, when the piston 120 reaches the initial position.

In addition, in the present embodiment, the second oil passages 123 and 125 and the check valve 124 are provided inside the piston 120. For this reason, the extension of the second oil passages 123 and 125 can be shortened compared to a configuration in which the second oil passages and the check valve are disposed outside the casing 110, namely, the back pressure chamber 10-1 and the pressure-increasing chamber 10-2 communicate with each other while bypassing the second oil passages (refer to FIG. 5).

Accordingly, the second oil passages 123 and 125 of which the extension is short can reduce the flow passage resistance force R2 acting on the oil passing through the second oil passages 123 and 125. For this reason, the biasing force $F_{S1}$ of the spring 140 can be kept small.

In addition, in the present embodiment, referring to FIG. 3B, an inner diameter D1 of the oil passages 80 and 81 is larger than an inner diameter D2 of the second oil passages 123 and 125 (D1>D2). Accordingly, an effective cross-sectional area S11 of the oil passages 80 and 81 is larger than an effective cross-sectional area S12 of the second oil passages 123 and 125 (S11>S12).

In addition, an area ratio between the effective cross-sectional area S11 and the effective cross-sectional area S12 is larger than an area ratio between the area S1 of the upper end surface 121*a* and the area S2 of the lower end surface 121*b* (S11/S12>S1/S2). Accordingly, the oil can be stably supplied to the back pressure chamber 10-1 and to the pressure-increasing chamber 10-2.

In addition, the pressure-receiving area of a valve body of the check valve 124 can be reduced compared to a configuration in which the area ratio between the effective cross-sectional area S11 and the effective cross-sectional area S12 is equal to or less than the area ratio between the area S1 of the upper end surface 121*a* and the area S2 of the lower end surface 121*b*. Further, the biasing force of the coil spring 124*a* can be reduced as the pressure-receiving area is reduced. Namely, the flow passage resistance force R2 when the oil passes through the second oil passages 123 and 125 can be reduced. Accordingly, a load acting on the spring 140 can be reduced.

In addition, the back pressure chamber 10-1 and the pressure-increasing chamber 10-2 directly communicate with each other through the second oil passages 123 and 125 and through the check valve 124. For this reason, an influence of a tank T side can be reduced.

In addition, even when the piston 120 moves from the initial position to the end position, as described above, the second switching valve 130 disconnects both the oil passages 131 and 132 and the oil passages 132 and 133. For this reason, the first switching valve 8 is prevented from operating and causing accidental switching of the oil passages.

Figure 2D:
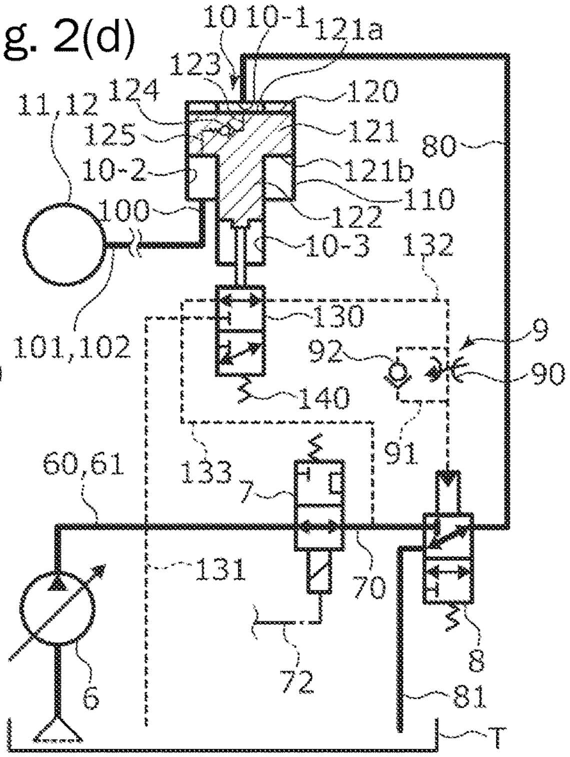

As illustrated in FIG. 2D, when the piston 120 reaches the initial position, the second switching valve 130 connects the oil passages 132 and 131. Accordingly, the hydraulic oil acting on the port 8-1 is discharged to the tank T through the pilot oil passage 91 and through the check valve 92. Then, when the pressure acting on the port 8-1 is less than the predetermined value, as illustrated in FIG. 2A, the first switching valve 8 allows communication between the oil passages 70 and 80.

Hereinafter, when the switch 15 is in an ON state, the first switching valve 8 and the second switching valve 130 switch between delivering the hydraulic oil from the pilot circuit hydraulic pump 6 to the back pressure chamber 10-1 and discharging the oil from the back pressure chamber 10-1 to the tank T by means of the fluid pressure, so that the above-described cycle can be repeatedly performed. Namely, the pressure-increasing device 10 can be continuously driven using the fluid pressure.

As described above, the fluid circuit of the present embodiment can continuously reciprocate the piston 120 via cooperation between the first switching valve 8, the second switching valve 130, and the spring 140 that mechanically operate. Namely, a high fluid pressure can be continuously generated without performing electric control. Accordingly, electric control as in the related art is not required, so that the configuration of the fluid circuit can be simplified.

In addition, the spring 140 has an adequate biasing force to move the piston 120 to the initial position and to the end position. For this reason, the spring 140 can reliably cause the piston 120 to reciprocate between the initial position and the end position, and can reliably switch the first switching valve 8 and the second switching valve 130.

In addition, the check valve 124 including the coil spring **124*a* is disposed between the second oil passages 123 and 125. For this reason, when the piston 120 is moved from the initial position to the end position, a problem that the hydraulic oil, which is increased in pressure, in the pressure-increasing chamber 10-2 flows back to the back pressure chamber 10-1** does not occur, so that a pressure-increasing efficiency is good.

The hydraulic oil that is increased in pressure by the pressure-increasing device 10 is delivered by the downward axial movement of the piston 120, and is accumulated in the accumulators 11 and 12. For this reason, the occurrence of a pulsation caused by the reciprocation of the piston 120 is prevented. Accordingly, the pressure-increasing device 10 can deliver a substantially constant amount of the hydraulic oil to the side of the accumulators 11 and 12.

The oil passage 107 including the check valve that is provided between the accumulators 11 and 12 and the main circuit can be divided into a section from the check valve to the main circuit side and a section from the check valve to the side of the accumulators 11 and 12, namely, an upstream side. Accordingly, even in a case where the main circuit side is a high-pressure specification, the fluid of a high pressure can be delivered without using an unnecessary high-pressure specification by setting a configuration on the side of the accumulators 11 and 12 to a minimum-pressure specification required for recovery of a high fluid pressure to a delivery destination.

Second Embodiment

A fluid circuit according to a second embodiment of the present invention will be described with reference to FIG. 5. Incidentally, descriptions of the same duplicate configurations as the configurations of the first embodiment will be omitted.

Figure 5:
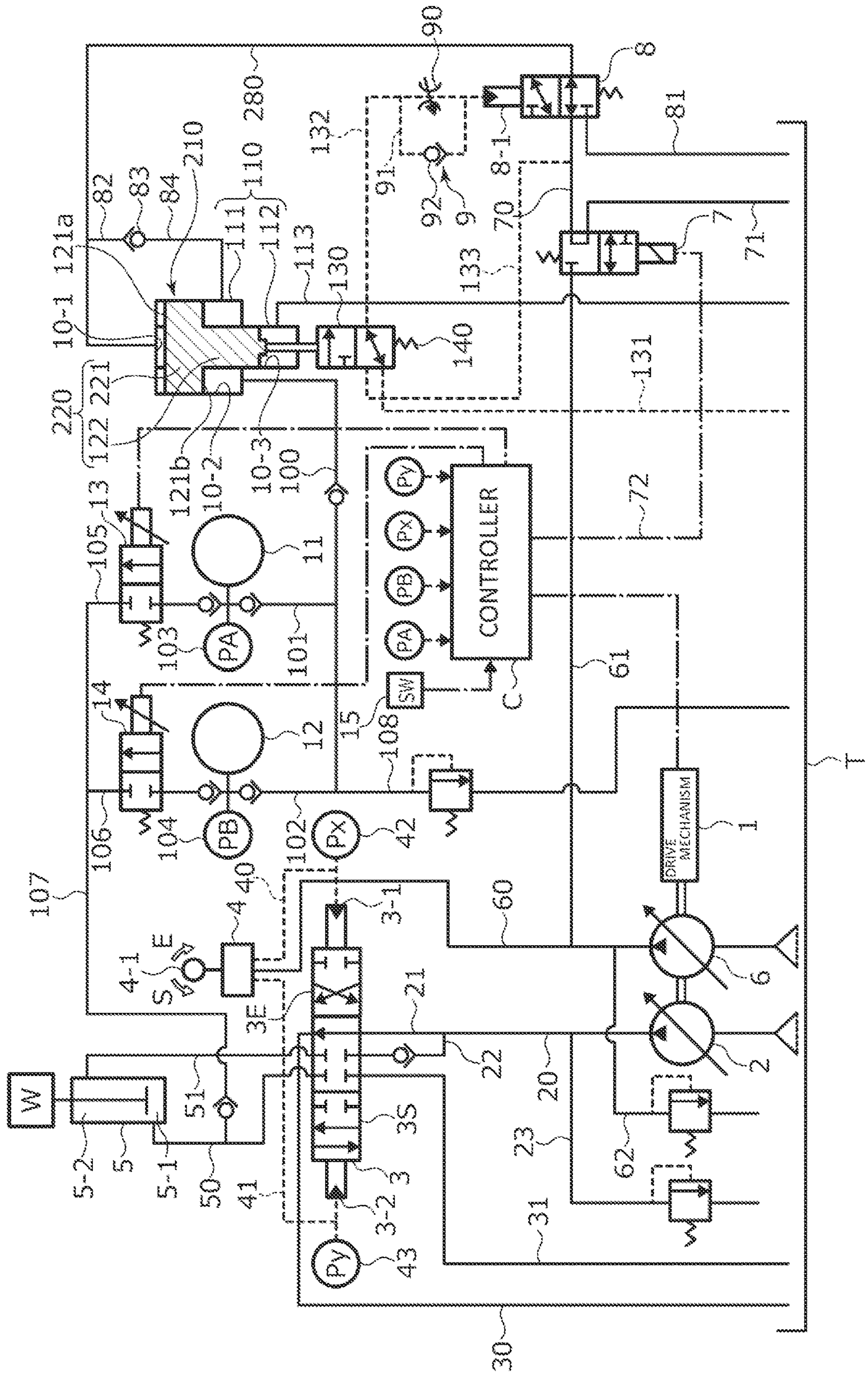
FIG. 5 is a schematic diagram illustrating a fluid circuit including a pressure-increasing device according to a second embodiment of the present invention.

As illustrated in FIG. 5, in the fluid circuit of the second embodiment, a first flow passage that connects the back pressure chamber 10-1 of a pressure-increasing device 210 and the tank T is formed of an oil passage 280 and the oil passage 81.

In addition, a second flow passage that connects the back pressure chamber 10-1 and the pressure-increasing chamber 10-2 is formed of a part of the oil passage 280, an oil passage 82 that is branched and connected to the oil passage 280, and an oil passage 84. A check valve 83 is disposed between the oil passages 82 and 84. Namely, in a large-diameter portion 221 of a piston 220, the back pressure chamber-side second oil passage 123, the check valve 124, and the pressure-increasing chamber-side second oil passage 125 of the first embodiment are omitted.

Even with such a configuration, the fluid circuit of the second embodiment can continuously generate a high fluid pressure without performing electric control.

In addition, compared to the case where the piston 120 is provided with the back pressure chamber-side second oil passage 123, the check valve 124, and the pressure-increasing chamber-side second oil passage 125 as in the first embodiment, the second flow passage can be simply configured.

The embodiments of the present invention have been described above with reference to the drawings; however, the specific configurations are not limited to the embodiments, and the present invention also includes changes or additions that are made without departing from the scope of the present invention.

For example, in the first and second embodiments, the configuration has been described in which the working fluid is oil; however, the present invention is not limited to the configuration, and the working fluid may be a fluid or may be changed as appropriate.

In addition, in the first and second embodiments, the fluid supply device has been described as being the pilot circuit hydraulic pump; however, the present invention is not limited to the configuration, and the fluid supply device may be a main circuit hydraulic pump, an actuator, an accumulator, or the like, or may be changed as appropriate.

In addition, in the first and second embodiments, the configuration has been described in which two accumulators are disposed on a downstream side of the pressure-increasing device; however, the present invention is not limited to the configuration, and the number of the accumulators may be one or may be three or more.

In addition, in the first and second embodiments, the configuration has been described in which the biasing member is a spring; however, the present invention is not limited to the configuration, and as long as a biasing force when the piston reaches the end position is smaller than a pressing force acting on the piston due to fluid pressure caused by the pump, and a biasing force when the piston reaches the initial position is larger than the sum of a flow passage resistance force acting on the first flow passage and a flow passage resistance force acting on the second flow passage, the biasing member may be changed to various cylinders or the like as appropriate.

In addition, in the first and second embodiments, the configuration has been described in which the spring biases the piston upward in the axial direction through the second switching valve; however, the present invention is not limited to the configuration, and the spring may be configured to directly bias the piston upward in the axial direction. For example, the pressure-increasing device can be configured compact by integrally connecting the piston and the second switching valve and by disposing the spring in the drain chamber.

In addition, in the first and second embodiments, the configuration has been described in which the biasing member of the check valve provided in the second flow passage is a coil spring; however, the present invention is not limited to the configuration, and the biasing member may be a plate spring, a disk spring, or the like, or may be changed as appropriate.

In addition, in the first and second embodiments, the configuration has been described in which the adjustable slow return valve is provided between the first switching valve and the second switching valve; however, the present invention is not limited to the configuration, and the adjustable slow return valve may be omitted.

REFERENCE SIGNS LIST

1 Drive mechanism
6 Pilot circuit hydraulic pump (fluid supply device)
8 First switching valve
10 Pressure-increasing device
10-1 Back pressure chamber
10-2 Pressure-increasing chamber
11, 12 Accumulator
80 Oil passage (first flow passage)
81 Oil passage (first flow passage)
110 Casing (cylinder)
120 Piston
123 Back pressure chamber-side second oil passage (second flow passage)
124 Check valve (check valve of second flow passage)
**124*a*** Spring (biasing portion of check valve of second flow passage)
125 Pressure-increasing chamber-side second oil passage (second flow passage)
130 Second switching valve
140 Spring (biasing member)
210 Pressure-increasing device
82, 84 Oil passage (second flow passage)
83 Check valve (check valve of second flow passage)
220 Piston
280 Oil passage (first flow passage and second flow passage)
T Tank

The invention claimed is:

1. A fluid circuit, comprising:
a pump configured to deliver a working fluid;
a tank that stores the working fluid;
a pressure-increasing device configured to increase a pressure of the working fluid; and
an accumulator configured to accumulate the working fluid which is increased in pressure by the pressure-increasing device,
wherein the pressure-increasing device includes a cylinder, a piston provided inside the cylinder so as to be reciprocatable in an axial direction, and a spring configured to bias the piston toward a first axial side,
a space inside the cylinder is partitioned into a back pressure chamber that is communicatable with a pump side and with a tank side and a pressure-increasing chamber that is communicatable with an accumulator side, by the piston, when the working fluid flows into the back pressure chamber from the pump, the piston is pressed to a second axial side opposed to the first axial side, and the working fluid that is increased in pressure in the pressure-increasing chamber is delivered to the accumulator side,
a first switching valve configured to switch between a flow passage which allows communication between the back pressure chamber and the pump side and a first flow passage which allows communication between the back pressure chamber and the tank side, according to a change in a fluid pressure to be applied, a second switching valve configured to switch to a flow passage which applies the fluid pressure to the first switching valve, when the piston has reached an initial position on the first axial side or when the piston has reached an end position on the second axial side, and a second flow passage configured to allow communication between the back pressure chamber and the pressure-increasing chamber,
a biasing force of the spring when the piston reaches the end position is smaller than a pressing force acting on the piston due to the fluid pressure caused by the pump, and a biasing force of the spring when the piston reaches the initial position is larger than a sum of a flow passage resistance force acting on the first flow passage and a flow passage resistance force acting on the second flow passage,
an effective cross-sectional area of the first flow passage is larger than an effective cross-sectional area of the second flow passage, and
an area ratio between an effective cross-sectional area of the first flow passage and an effective cross-sectional area of the second flow passage is larger than an area ratio between an effective pressure-receiving area of the back pressure chamber and an effective pressure receiving area of the pressure-increasing chamber.

2. The fluid circuit according to claim 1,
wherein the piston includes the second flow passage.

3. The fluid circuit according to claim 1,
wherein a check valve including a biasing portion configured for biasing in a closing direction is disposed in the second flow passage.

4. The fluid circuit according to claim 2,
wherein a check valve including a biasing portion configured for biasing in a closing direction is disposed in the second flow passage.

5. The fluid circuit according to claim 4,
wherein an area ratio between an effective cross-sectional area of the first flow passage and an effective cross-sectional area of the second flow passage is larger than an area ratio between an effective pressure-receiving area of the back pressure chamber and an effective pressure-receiving area of the pressure-increasing chamber.

* * * * *